United States Patent
De Mattia

(10) Patent No.: US 8,991,014 B2
(45) Date of Patent: Mar. 31, 2015

(54) FIBRE LAYING MACHINE COMPRISING A ROLLER WITH PIVOTING RINGS

(71) Applicant: Airbus Operations SAS, Toulouse (FR)

(72) Inventor: Denis De Mattia, Basse Goulaine (FR)

(73) Assignee: Airbus Operations SAS (FR)

( * ) Notice: Subject to any disclaimer, the term of this patent is extended or adjusted under 35 U.S.C. 154(b) by 0 days.

(21) Appl. No.: 14/105,310

(22) Filed: Dec. 13, 2013

(65) Prior Publication Data

US 2014/0165337 A1 Jun. 19, 2014

(30) Foreign Application Priority Data

Dec. 18, 2012 (FR) ..................................... 12 62217

(51) Int. Cl.
*D04H 3/04* (2012.01)
*B29C 70/38* (2006.01)

(52) U.S. Cl.
CPC ................ *D04H 3/04* (2013.01); *B29C 70/384* (2013.01)
USPC .......................................................... 19/299

(58) Field of Classification Search
USPC ........ 19/299; 156/166; 492/28, 30, 33, 36, 48
See application file for complete search history.

(56) References Cited

U.S. PATENT DOCUMENTS

| | | | | | |
|---|---|---|---|---|---|
| 5,355,567 | A | * | 10/1994 | Holliday | 28/282 |
| 5,454,897 | A | * | 10/1995 | Vaniglia | 156/166 |
| 6,105,648 | A | * | 8/2000 | De Graaf et al. | 156/421 |
| 6,390,169 | B1 | * | 5/2002 | Johnson | 156/523 |
| 2007/0044922 | A1 | | 3/2007 | Mischler et al. | |

FOREIGN PATENT DOCUMENTS

| | | |
|---|---|---|
| FR | 2 975 334 A1 | 11/2012 |
| WO | 2012160269 A1 | 11/2012 |

* cited by examiner

*Primary Examiner* — Shaun R Hurley
(74) *Attorney, Agent, or Firm* — Lerner, David, Littenberg, Krumholz & Mentlik, LLP

(57) ABSTRACT

A fiber laying machine includes a laying head with a roller able to pivot about an axis of rotation and to apply a plurality of preimpregnated fibers to an application surface by rolling over the application surface. The fibers are distributed along a lower generatrix of the roller and in contact with an exterior surface of the roller over an angle of wrap. The roller includes a cylindrical body, pivoting rings around the body, and means for immobilizing the pivoting rings with respect to the body in a direction parallel to the axis of rotation. The pivoting rings are able to pivot independently of one another.

13 Claims, 3 Drawing Sheets

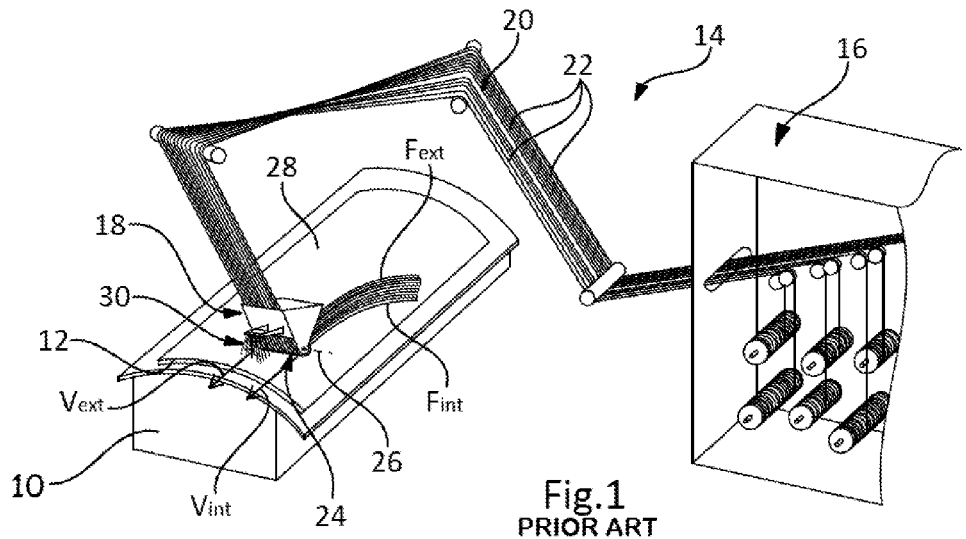
Fig.1
PRIOR ART
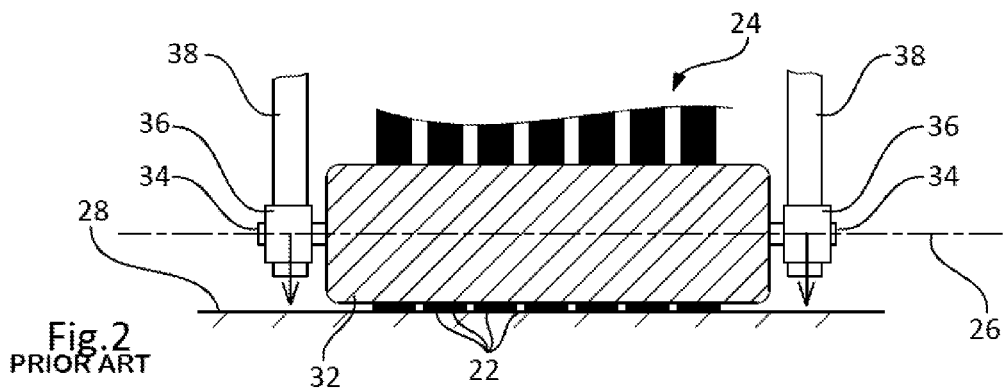
Fig.2
PRIOR ART
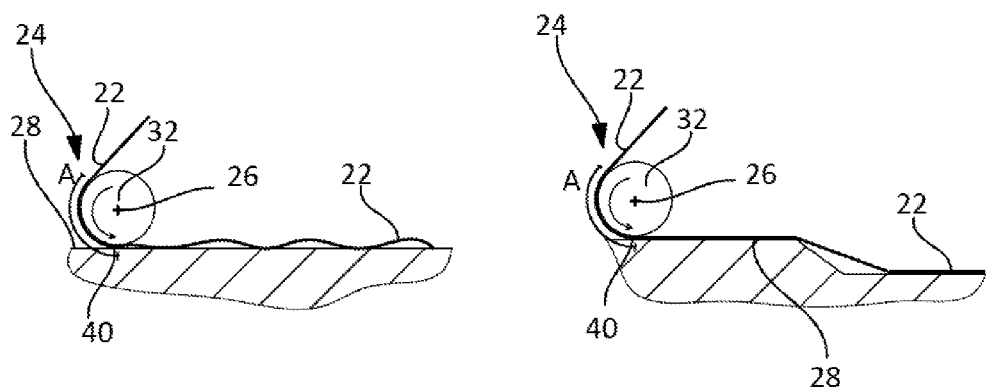
Fig.3A
PRIOR ART
Fig.3B
PRIOR ART

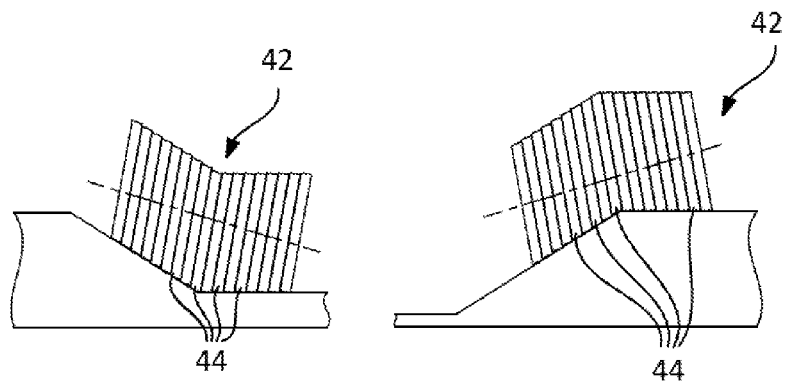
Fig.4A
PRIOR ART
Fig.4B
PRIOR ART
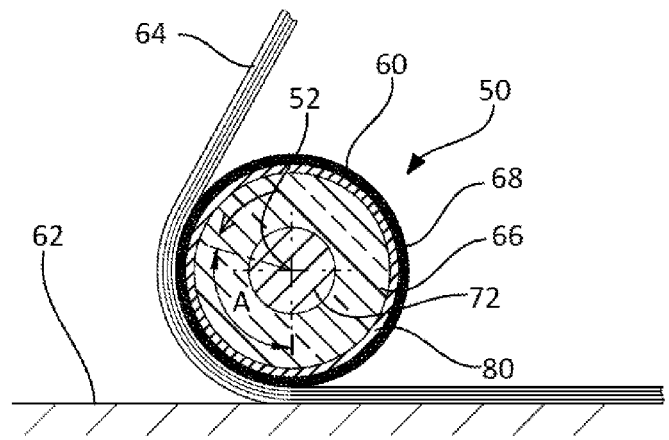
Fig.5
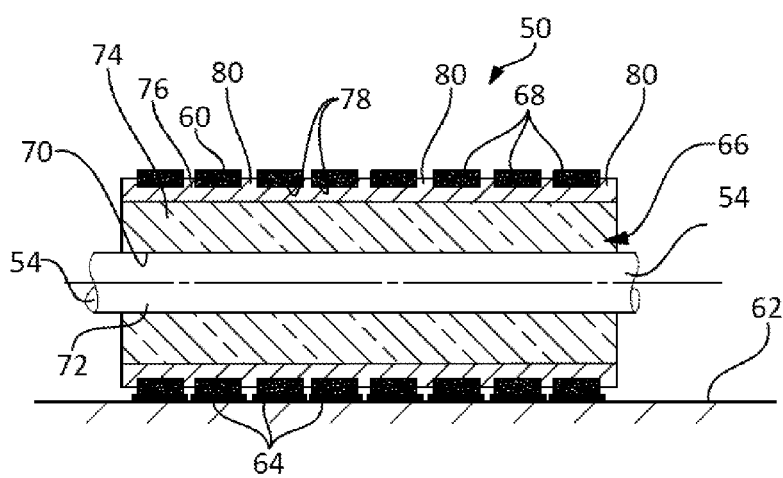
Fig.6

FIBRE LAYING MACHINE COMPRISING A ROLLER WITH PIVOTING RINGS

TECHNICAL FIELD

The present invention relates to a fibre laying machine comprising a roller with pivoting rings.

The invention relates more specifically to the preforms produced from fibres preimpregnated with resin which are then polymerized during a consolidation step that does not involve further addition of resin.

BACKGROUND OF THE INVENTION

According to one procedure, a component made of composite material is produced from a fibre preform subjected to a polymerization cycle.

A preform here means a volume of fibres which are laid in a set arrangement, notably obtained by superposing layers of fibres on top of one another on a mould surface.

When the surface of the mould is a developable surface, it is possible to use layup machines which seek to apply to the mould fibre plies the dimensions of which may be as large as those of the component. In such cases, each layer may consist of a single ply.

When the surface of the mould is not a developable surface, use may be made of a fibre laying machine that allows a plurality of fibres lying side by side to be applied simultaneously. Thus, a fibre laying machine allows a strip of fibres to be applied in each pass.

As an alternative, a laying machine may allow several slivers of fibres to be applied simultaneously. Slivers of fibres mean a group of fibres. A sliver is generally planar and of narrow width, of the order of one centimeter wide or less. As an idea of an order of magnitude, a sliver of fibres may be of the order of 12 mm, 6 mm or 3 mm wide.

In the remainder of the description, a fibre means a longilinear element which may consist of a single fibre or of several fibres in the manner of a sliver.

An application surface corresponds to the surface of the mould in the case of the first layer of fibres or to the latest layer applied in the case of the other layers.

FIG. 1 depicts a mould 10 on which a preform 12 is formed using a fibre laying machine 14.

This machine 14 comprises a magazine of fibres 16, a mobile laying head 18 supported by a robot (not depicted) such as an articulated arm for example, and means 20 for conveying the fibres 22 from the magazine 16 to the laying head 18.

The laying head 18 comprises a roller 24 able to pivot about an axis of rotation 26 moving over the application surface 28 and means 30 for heating the application surface ahead of the roller 24 in order to activate the resin of the fibres 22 laid by the roller to encourage the fibres to adhere to the application surface so that they maintain their positions.

In the remainder of the description, the longitudinal direction means a direction parallel to the axis of rotation of the roller. A longitudinal plane corresponds to a plane containing the axis of rotation. A transverse plane corresponds to a plane perpendicular to the axis of rotation. A radial direction is a direction perpendicular to the axis of rotation.

According to an embodiment illustrated in FIG. 2, the roller 24 comprises a cylindrical body 32 of one piece with two stub shafts 34 at each end pivot-mounted in bearings 36 of a support 38 secured to the laying head. The stub shafts 34/bearings 36 guidance defines the axis of rotation 26.

The support 38 applies a force to the roller 24 in the direction of the application surface 28 so that the roller 24 applies, on a lower generatrix 40, a force to the fibres 22 that are to be laid forcing them towards the application surface 28.

The roller can pivot freely about the axis of rotation 26. Its movement of rotation about the axis of rotation 26 results from the rolling of the roller 24 along the application surface 28.

According to one embodiment, the cylindrical body 32 is made of an elastomer coated with a teflon film. The cylindrical body and the film are intimately bonded and cannot move relative to one another.

The magazine of fibres 16 also referred to as a creel comprises a plurality of reels of fibres. The magazine 16 comprises means for applying constant tension to each of the fibres regardless of the speed or acceleration of the laying head 18.

If the tension for a given fibre 22 is insufficient, it causes axial compression of the fibre 22 as it is compacted by the roller 24, causing the fibre to wrinkle as illustrated in FIG. 3A, and these wrinkles will remain included in the preform in the form of small corrugations which will impair the mechanical properties of the component produced.

If the tension in a given fibre 22 is too high, it will cause bridging across a hollow in the component, as illustrated in FIG. 3B, and this bridging will remain included in the preform and lead to a defect that will have an impact on the mechanical properties of the component produced.

The fibres are laid at an ambient temperature of 20° C. or above. That being the case, each fibre is paid out by the simultaneous combination of two effects:

The first effect stems from the rolling of the roller over the fibre and should in theory make it possible to pay out a quantity of fibre that is equal to the distance covered by the roller if the fibre were in contact with the roller only along the lower generatrix 40 of the roller.

The second effect stems from the adhesion of the fibre to the roller over a certain angle of wrap A (visible in FIGS. 3A and 3B).

This last effect generally leads to defects for the following reasons.

In general, the path of the laying head is not necessarily straight and may describe a curve. When that happens, for a given rate of travel of the centre of the roller, the rate of travel Vext of a first end of the roller is greater than the rate of travel Vint of a second end of the roller in a curve. Now, bearing in mind the second effect caused by the adhesion of the fibres to the roller, the tangential speed of each fibre is constant at the lower generatrix of the roller and equal to the rotational speed of the roller θ multiplied by the radius of the roller R.

Therefore, if Vext is greater than θ.R, the fibre Fext applied at this point is too highly tensioned, and this tends to cause defects of the bridging type as illustrated in FIG. 3B. At the same time, if Vint is less than θ.R, the fibre Fint applied at this point is insufficiently tensioned, and this tends to cause defects of the wrinkling type as illustrated in FIG. 3A.

To limit the appearance of such defects, one first solution is to apply the fibres dry, not preimpregnated. In that case, the fibres can slip on the roller and become suitably tensioned. However, this solution entails the use of other polymerization techniques which need to allow the fibres to become impregnated with a resin. These polymerization techniques are generally more complicated to perform. In addition, insofar as the fibres are not preimpregnated, they can slide relative to one another within the preform and fail to be correctly positioned in the end analysis.

A second solution might be to envisage reducing the angle of wrap A in order to reduce the friction forces between the fibres and the roller. However, this solution is difficult to put into practice because it entails changing the design of the laying head. In addition, a certain angle of wrap is needed in order to guide the fibres. Thus, reducing the angle of wrap leads to impaired precision with which the fibres can be positioned in the longitudinal direction.

Document U.S. Pat. No. 6,390,169 proposes a third solution which is to use a segmented roller 42 as illustrated in FIGS. 4A and 4B. Each segment of the roller 44 is dedicated to one fibre and can have a rotation speed that differs from those of the other segments. Thus, the rotation speed of each segment of the roller is adapted to suit the displacement speed of the point of the said segment in contact with the application surface. As a result, each fibre is correctly tensioned.

Even though it limits the risks of the appearance of defects of the bridging or wrinkling type, this solution is not entirely satisfactory because the roller is relatively complex. Moreover, because each segment has a large radius of the order of 35 mm, the roller is unable to apply the fibres correctly against the application surface if the latter has an indentation of a radius of curvature smaller than 35 mm.

BRIEF SUMMARY OF THE INVENTION

Hence, aspects of the present invention may overcome the disadvantages of the prior art.

An embodiment of the invention is a fibre laying machine comprising a laying head with a roller able to pivot about an axis of rotation and to apply a plurality of preimpregnated fibres to an application surface by rolling over the application surface, the fibres being distributed along a lower generatrix of the roller and in contact with an exterior surface of the roller over an angle of wrap, characterized in that the roller comprises:

a cylindrical body,
pivoting rings around the body,
means for immobilizing the pivoting rings with respect to the body in a direction parallel to the axis of rotation, the said pivoting rings being able to pivot independently of one another.

Preferably, the roller comprises as many pivoting rings as there are fibres applied simultaneously by the roller.

This configuration allows the paying-out of each fibre to be adapted to suit.

Advantageously, the roller comprises means for encouraging the pivoting rings to pivot with respect to the cylindrical body. Thus, the pivoting rings and the body are made of materials such that the coefficient of friction between the fibres and the pivoting rings is far higher than that between the pivoting rings and the body, at least at the temperature at which the fibres are applied.

According to one embodiment, the pivoting rings are made of polytetrafluoroethylene.

According to one embodiment, the body is made of elastomer.

According to another feature, the pivoting rings are closely spaced in a direction parallel to the axis of rotation. This configuration makes it possible to limit the interactions between the pivoting rings.

According to a first alternative form, the body comprises a main body and a sleeve coaxial with the main body which comprises, on its exterior surface, circumferential grooves of a width equal to that of the pivoting rings, the grooves being separated by ribs which immobilize the pivoting rings in a direction parallel to the axis of rotation. According to this alternative form, the sleeve is made of a suitable material allowing it to deform when it is not fitted over the main body so as to fit the pivoting rings into the grooves.

According to a second alternative form, the body comprises a plurality of sections stacked along a spindle which defines the axis of rotation, the sections each having a flange at one end, the flanges of these sections being interposed between two successive pivoting rings so as to immobilize them.

According to another feature, the laying head comprises at least one tongue which is slipped in between the roller and one or more fibres so as to reduce the angle of wrap over which the fibre or fibres are in direct contact with the roller. This configuration makes it possible to reduce the friction forces between the fibres and the roller.

BRIEF DESCRIPTION OF THE DRAWINGS

Other features and advantages will become apparent from the description which follows of the invention, which description is given purely by way of example with reference to the attached drawings in which:

FIG. 1 is a perspective view of a laying machine according to the prior art, FIG. 2 is a face-on view of a roller of a laying machine according to the prior art, FIG. 3A is a side view of the roller of FIG. 2 giving rise to a first type of defect, FIG. 3B is a side view of the roller of FIG. 2 giving rise to a second type of defect, FIGS. 4A and 4B are face-on views of a roller according to the prior art in contact with contact surfaces that present different profiles, FIG. 5 is a cross section through a first alternative form of a roller of a fibre laying machine according to an embodiment of the invention, FIG. 6 is a longitudinal section through the roller illustrated in FIG. 5.

DETAILED DESCRIPTION

Figure 7:
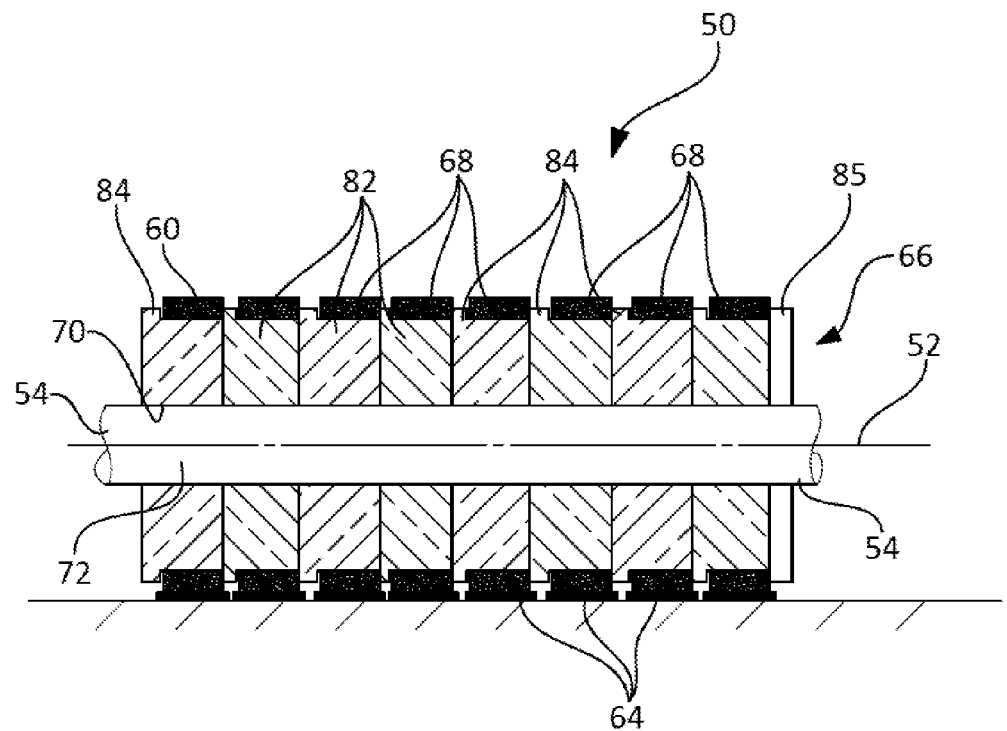
FIG. 7 is a cross section through a second alternative form of a roller of a fibre laying machine according to an embodiment of the invention.

FIGS. 5 to 8 depict a roller 50 of a fibre laying machine able to pivot about an axis of rotation 52.

As in the prior art, the roller 50 comprises means for connecting it to a laying head. According to one embodiment, the roller 50 comprises at each end a stub shaft 54 pivot-mounted in a bearing of a support secured to the laying head. These guidances of the stub shafts 54 in their bearings define the axis of rotation 52. The laying machine, the connection between the roller and the laying head are not described in further detail because they are known to those skilled in the art and may be identical to those of the prior art inasmuch as the roller 50 according to an embodiment of the invention is more particularly suited to being mounted on existing fibre laying machines in place of the rollers of the prior art.

According to one embodiment, the roller 50 comprises a substantially cylindrical exterior surface 60 which can roll over an application surface 62 so as to lay fibres 64. As illustrated in FIG. 5, each fibre 64 is in contact with the exterior surface 60 over an angle of wrap A which is dependent on the design of the laying head. As an idea of an order of magnitude, this angle of wrap A may be greater than one quarter of the circumference of the roller and less than half the circumference.

The fibres 64 are preimpregnated with a resin. The fibres and the resin are chosen according to the component that is to be produced.

At ambient temperature, of 20° C. or above, the preimpregnated fibres 64 have a relatively high tack which gives the fibres a stickiness and ability to adhere to the application surface 62 allowing the fibres to maintain their positions until the consolidation step.

According to an embodiment of the invention, the roller 50 comprises a cylindrical body 66 and pivoting rings 68 around the body 66 so as to form an interface between the fibres 64 and the body 66 of the roller 50. The pivoting rings 68 are offset in the longitudinal direction and can pivot independently of one another in order best to adapt the paying-out of the fibres and limit the appearance of defects like those illustrated in FIGS. 3A and 3B.

The pivoting rings 68 have exterior surfaces which constitute the exterior surface 60 of the roller 50.

According to one embodiment, the body 66 comprises an interior bore 70 which is mounted on a spindle 72 the ends of which correspond to the stub shafts 54. For preference, the body 66 cannot pivot with respect to the spindle 72, the latter being pivot-mounted at each of its ends on bearings secured to the laying head.

According to one embodiment, the cylindrical body 66 is made of elastomer and the spindle 72 is made of metal.

According to a simplified alternative form (not illustrated), a roller 50 may comprise just two pivoting rings.

Advantageously, the roller 50 comprises as many pivoting rings 68 as there are fibres 64 applied simultaneously by the roller. This solution allows the paying-out of each fibre 64 to be adapted to suit its path and limits the appearance of defects.

According to an aspect of the invention, the roller comprises means to encourage the pivoting rings 68 to pivot with respect to the cylindrical body 66 so as to make it possible for each fibre to move with respect to the body 66, independently of one another.

For preference, the coefficient of friction between the fibres 64 and the pivoting rings 68 is far higher than that between the pivoting rings 68 and the body 66, at least at the temperature at which the fibres 64 are applied.

Thus, at the application temperature of the order of 18 to 22° C., and bearing in mind the tack of the resin, the fibres 64 are unable to slip either with respect to the application surface 62 or with respect to the pivoting rings 68. As a result, the length of each fibre paid out is the result of the rolling of the roller over the application surface so that the paid-out length of each fibre is equal to the length of the path of each fibre.

According to one embodiment, each pivoting ring 68 is made of polytetrafluoroethylene so that the fibres 64 adhere to the exterior surface of the pivoting rings 68 and so that each pivoting ring 68 can easily pivot with respect to the body 66, independently of one another.

For preference, all the pivoting rings 68 of one and the same roller are the same. By way of example, they have a thickness (in a radial direction) of the order of 5 mm and a width substantially identical to that of the fibres.

Advantageously, the pivoting rings 68 are closely spaced in the longitudinal direction so as to be able to pivot independently of one another and limit interactions between them.

According to another feature of the invention, the roller comprises means for immobilizing the pivoting rings with respect to the body 66 in the longitudinal direction. Thus, the pivoting rings 68 can only pivot with respect to the body 66 and are incapable of any translational movement with respect to the body 66 in the longitudinal direction.

This feature makes it possible to achieve the precision with which the fibres are applied and limits the risks of shearing of the pivoting rings which are generally of small thickness.

There are various conceivable solutions for immobilizing the pivoting rings 68 in the longitudinal direction. Two alternative forms are illustrated in FIGS. 6 and 7.

In a first alternative form illustrated in FIG. 6, the body 66 comprises a main body 74 and a sleeve 76 coaxial with the said main body 74, made of a suitable material allowing it to deform when it is not slipped over the main body 74. In operation, the main body 74 and the sleeve 76 are immobile relative to one another.

The inside diameter of the sleeve 76 is equal to the outside diameter of the main body 74.

The sleeve 76 on its exterior surface has circumferential grooves 78 of a width (in the longitudinal direction) equal to that of the pivoting rings 68, the said grooves 78 being separated by ribs 80 which immobilize the pivoting rings 68 in the longitudinal direction. For this purpose, the bottom of the grooves is of a diameter equal to the inside diameter of the pivoting rings 68. The ribs 80 have a diameter greater than the inside diameter of the pivoting rings 68 but less than the outside diameter of these rings.

The sleeve 76 is of small thickness (in the radial direction) so that it can deform.

Thus, before the sleeve 76 is slipped over the main body 74, the pivoting rings 68 are fitted into the grooves 78 of the sleeve by slightly elastically deforming the latter. When all of the pivoting rings 68 have been fitted onto the sleeve 76, the latter is slipped over the main body 74.

In this alternative form, the main body 74 and the sleeve 76 are made of a material such as elastomer and extend over the entire width (in the longitudinal direction) of the roller. This configuration offers the advantage of conserving all the compliance of the pressing of an elastomer roller so that it can conform to the application surface at all points, even where there are irregularities, and better distribute load, unlike a segmented roller like the one described in document U.S. Pat. No. 6,390,169.

According to a second alternative form illustrated in FIG. 7, the body 66 comprises a plurality of sections 82 stacked along a spindle 72 in the longitudinal direction. Unlike a segmented roller all the segments of which can pivot relative to one another, the sections 82 are immobile relative to one another in operation.

The body 66 comprises as many sections as there are pivoting rings 68.

Each section 82 has an inside diameter equal to that of the spindle 72 and an outside diameter equal to the inside diameter of the pivoting rings 68.

Each section 82 at one end comprises a flange 84, the flanges 84 of the sections being interposed between two successive pivoting rings 68.

The outside diameter of the flanges 84 has a diameter greater than the inside diameter of the pivoting rings 68 and less than the outside diameter of these rings.

Advantageously, all the sections 82 are the same. They are preferably made of elastomer. The width of the flanges and of the sections are adapted to suit those of the pivoting rings 68 so that the latter are perfectly immobilized in the longitudinal direction when the sections 82 are slipped over the spindle 72.

In the example illustrated in FIG. 7, a washer 85 is provided at one end of the roller to immobilize the first pivoting ring which is in abutment with just one flange 84 if the washer 85 is absent.

Insofar as the fibres do not slide with respect to the pivoting rings and are therefore perfectly guided, it is possible to reduce the angle of wrap A of the fibres over the roller 50.

Figure 8:
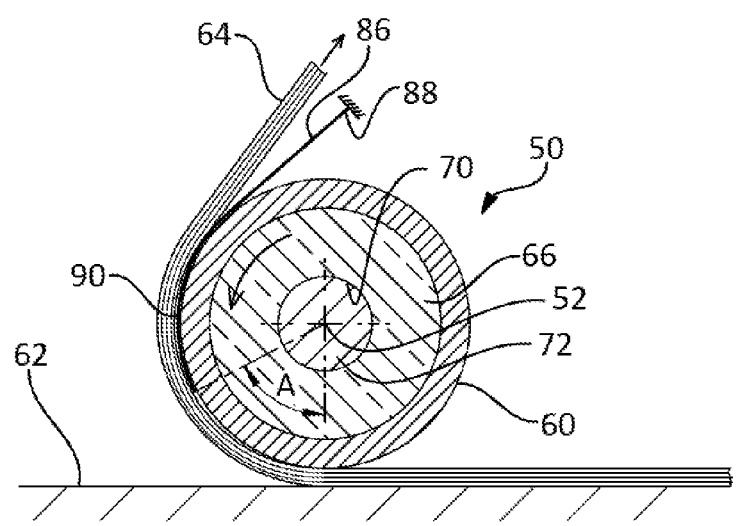
FIG. 8 is a cross section through another alternative form of a roller of a fibre laying machine according to the invention.

To do that, as illustrated in FIG. 8, the laying head comprises at least one tongue 86 which slips in between the roller 50 and one or more fibres 64.

This tongue 86 at one end 88 comprises means for immobilizing it with respect to the laying head. According to one embodiment, the tongue 86 is fixed to the laying head at a first end 88.

The second end 90 of the tongue 86 slips in between the roller 50 and at least one fibre 64 so as to reduce the angle of wrap A over which the fibres are in direct contact with the roller 50.

According to one embodiment, the laying head comprises a single tongue 86 of a width substantially identical to that of the roller 50.

This tongue 86 has a certain thickness and is made of a suitable material so that it follows the curved profile of the roller. According to one embodiment, the tongue 86 is a polyethylene film.

According to this feature, it is possible to reduce the angle of wrap A which may be less than 90° according to an embodiment of the invention and be of the order of 60°.

The invention claimed is:

1. A fibre laying machine comprising:
a laying head with a roller configured to pivot about an axis of rotation and to apply a plurality of preimpregnated fibres to an application surface by rolling over the application surface;
wherein the fibres are distributed along a lower generatrix of the roller and in contact with an exterior surface of the roller over an angle of wrap, wherein the roller comprises:
a cylindrical body;
at least first and second pivoting rings around the body; and
a plurality of ribs or flanges for immobilizing the pivoting rings with respect to the body in a direction parallel to the axis of rotation, each of the at least first and second pivoting rings immobilized by first and second of the plurality of ribs or flanges positioned on opposing sides of the pivoting ring,
wherein the at least first and second pivoting rings are configured to pivot independently of one another.

2. The fibre laying machine according to claim 1, wherein the roller comprises as many pivoting rings as there are fibres applied simultaneously by the roller.

3. The fibre laying machine according to claim 1, wherein the roller comprises means for encouraging the pivoting rings to pivot with respect to the cylindrical body.

4. The fibre laying machine according to claim 3, wherein the pivoting rings and the body are made of materials such that the coefficient of friction between the fibres and the pivoting rings is higher than that between the pivoting rings and the body, at least at the temperature at which the fibres are applied.

5. The fibre laying machine according to claim 4, wherein the pivoting rings are made of polytetrafluoroethylene.

6. The fibre laying machine according to claim 4, wherein the body is made of elastomer.

7. The fibre laying machine according to claim 1, wherein the pivoting rings are closely spaced in a direction parallel to the axis of rotation.

8. A fibre laying machine comprising:
a laying head with a roller configured to pivot about an axis of rotation and to apply a plurality of preimpregnated fibres to an application surface by rolling over the application surface;
wherein the fibres are distributed along a lower generatrix of the roller and in contact with an exterior surface of the roller over an angle of wrap, wherein the roller comprises:
a cylindrical body;
at least first and second pivoting rings around the body; and
means for immobilizing the pivoting rings with respect to the body in a direction parallel to the axis of rotation,
wherein the at least first and second pivoting rings are configured to pivot independently of one another,
wherein the body comprises:
a main body; and
a sleeve coaxial with the main body and comprising, on an exterior surface thereof, at least first and second circumferential grooves of a width equal to that of the pivoting rings, the grooves being separated by ribs immobilizing the pivoting rings in a direction parallel to the axis of rotation.

9. The fibre laying machine according to claim 8, wherein the sleeve is made of a suitable material configured to deform when the sleeve is not fitted over the main body so as to fit the pivoting rings into the grooves.

10. The fibre laying machine according to claim 1, wherein the body comprises a plurality of sections stacked along a spindle defining the axis of rotation, the sections each having a flange at one end, the flanges of the sections being interposed between two successive pivoting rings so as to immobilize the pivoting rings.

11. A fibre laying machine comprising:
a laying head with a roller configured to pivot about an axis of rotation and to apply a plurality of preimpregnated fibres to an application surface by rolling over the application surface,
wherein the fibres are distributed along a lower generatrix of the roller and in contact with an exterior surface of the roller over an angle of wrap, wherein the roller comprises:
a cylindrical body;
at least first and second pivoting rings around the body; and
means for immobilizing the pivoting rings with respect to the body in a direction parallel to the axis of rotation,
wherein the at least first and second pivoting rings are configured to pivot independently of one another,
wherein the laying head comprises at least one tongue slipped in between the roller and one or more fibres so as to reduce the angle of wrap over which the fibre or fibres are in direct contact with the roller.

12. The fibre laying machine according to claim 11, wherein the laying head comprises a single tongue of a width substantially identical to that of the roller.

13. The fibre laying machine according to claim 12, wherein the tongue is a polyethylene film.

* * * * *